Aug. 9, 1966  J. E. RUSSELL  3,265,406
AUTOMOBILE TRAILER HITCH
Filed Aug. 6, 1964  2 Sheets-Sheet 1
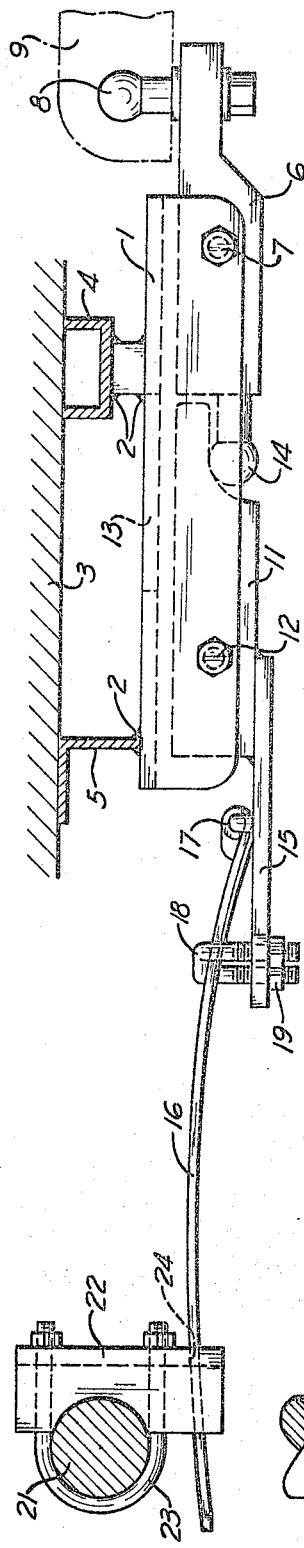
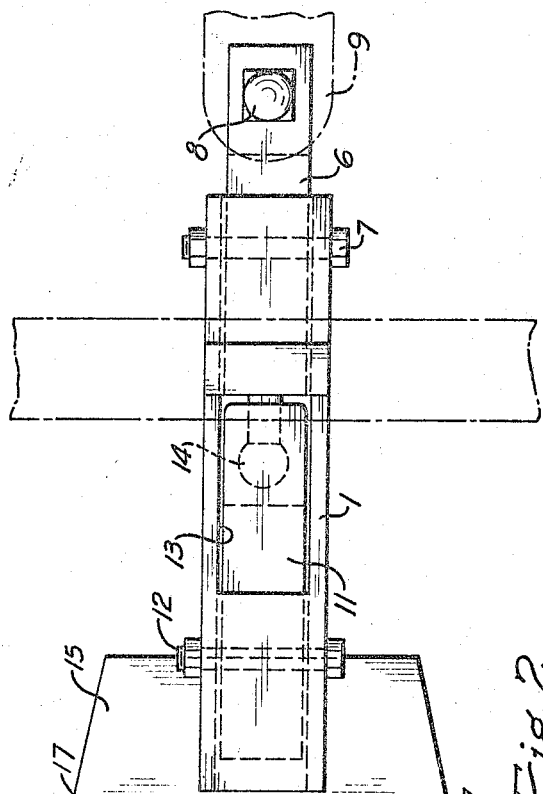
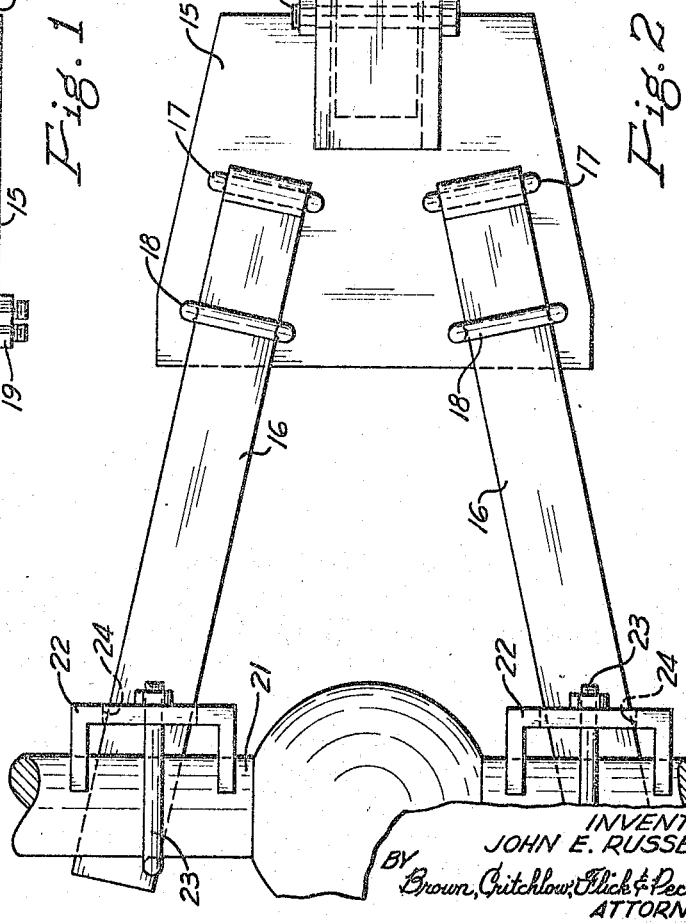
INVENTOR.
JOHN E. RUSSELL
BY Brown, Critchlow, Flick & Peckham
ATTORNEYS.

Aug. 9, 1966 — J. E. RUSSELL — 3,265,406
AUTOMOBILE TRAILER HITCH
Filed Aug. 6, 1964 — 2 Sheets-Sheet 2
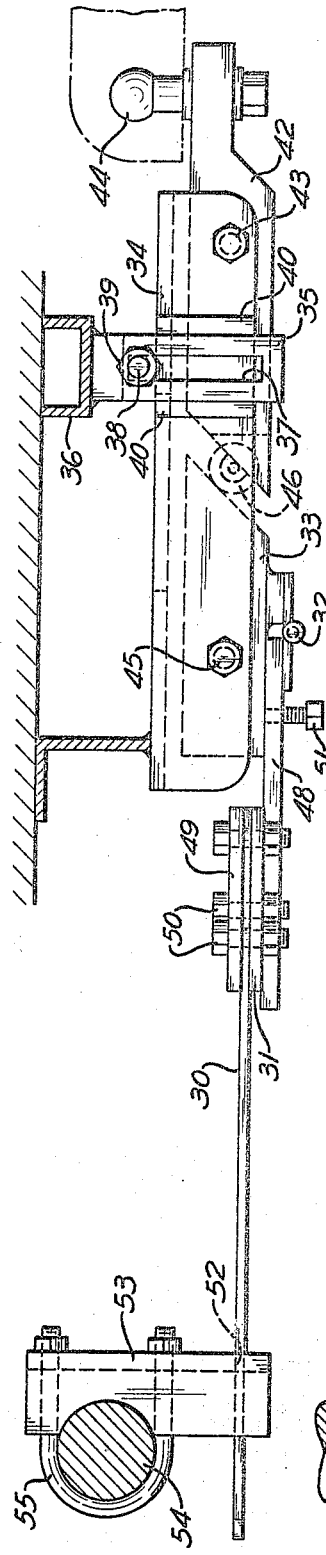
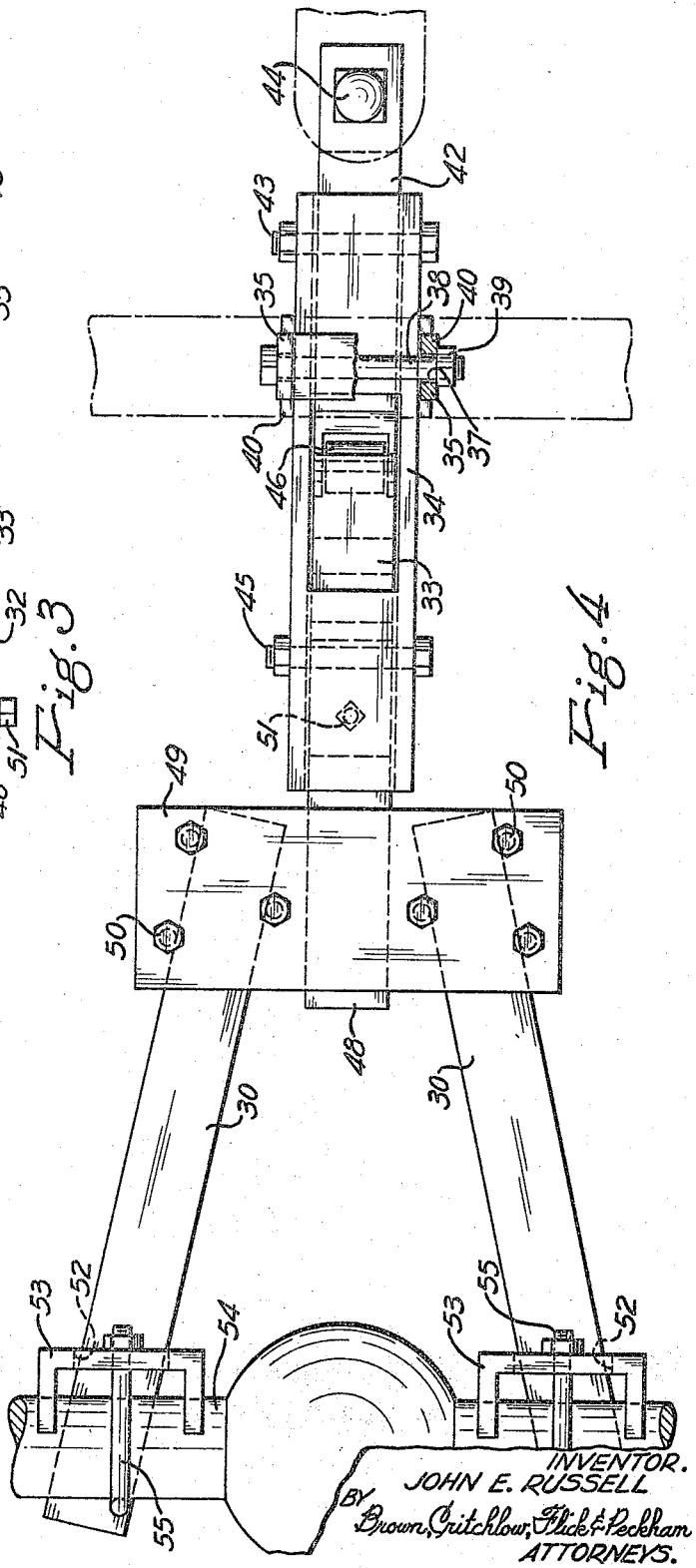
INVENTOR.
JOHN E. RUSSELL
BY Brown, Critchlow, Flick & Peckham
ATTORNEYS.

United States Patent Office 3,265,406
Patented August 9, 1966

3,265,406
AUTOMOBILE TRAILER HITCH
John E. Russell, R.D. 6, Butler, Pa.
Filed Aug. 6, 1964, Ser. No. 387,940
5 Claims. (Cl. 280—406)

This invention relates to hitches secured to the rear ends of automobiles so that they can haul trailers.

The usual type of trailer hitch includes an upstanding metal ball that is clamped to the rear bumper of an automobile or that is rigidly connected in any suitable manner to the frame of the vehicle. The trailer tongue is fastened to the ball and presses down on it. As the two vehicles move over the road, the vertical movement of the front end of the trailer is transmitted through the hitch to the rear end of the automobile so that the latter is continually bouncing up and down. This not only makes the ride uncomfortable, but it makes it difficult to drive. In fact, on a rough road the situation becomes dangerous.

It is among the objects of this invention to provide an automobile trailer hitch which automatically compensates for the vertical movements of the trailer so that the towing automobile is not affected appreciably by those movements.

In accordance with this invention a rigid supporting member is adapted to be secured rigidly to the bottom of the rear end of an automobile body. Pivotally connected to this member on a horizontal axis is a tow lever that projects rearwardly and supports means on its rear end for a trailer connection. Another lever is pivotally connected to the supporting member in front of the tow lever and has a rear end overlapping and engaging the front end of the tow lever. Attached to the front lever and projecting forward from it is a plate, secured to which are the rear end portions of a pair of forwardly diverging leaf springs. Means are provided for fastening the front ends of the springs to the rear axis of the automobile in a position that requires the springs to be stressed upwardly. Consequently, when downward pressure on the rear end of the tow lever causes it to swing the rear end of the front lever upwardly, the leaf springs will resist depression by the tilted front lever, with the result that the front lever will prevent the supporting member from being removed downwardly any appreciable distance by the tow lever.

The invention is illustrated in the accompanying drawings, in which

FIG. 1 is a side view of my hitch;
FIG. 2 is a plan view thereof; and
FIGS. 3 and 4 are views, similar to FIGS. 1 and 2, of a modification.

Referring to FIGS. 1 and 2 of the drawings, a lever-supporting member, preferably an inverted channel 1, is rigidly secured by bolts or welding 2 to the bottom of the rear end of an automobile body 3 so that the supporting member cannot tilt. If there is no suitable support for this channel at the desired location, cross members 4 and 5 can be secured to the bottom of the frame and then the channel secured to the cross members. The rear end of channel 1 is generally located at about the bottom of the rear bumper. Partially disposed inside the rear portion of the channel is a tow lever 6, the central portion of which is pivotally connected by a cross pin 7 to the side flanges of the channel. The lever, when parallel to the top of the channel, is spaced a short distance therefrom so that the lever can be rocked on its pivot. The rear end of the lever projects from the channel and carries a ball 8 or the like for connection to a trailer tongue 9, shown in dotted lines, that will press down on the lever.

The front end of the tow lever is located near the center of supporting channel 1 and is overlapped by the front end of another lever 11 that extends forward through the channel. The front end of this front lever terminates near the front end of the channel. The front lever is pivotally mounted on a cross pin 12 extending through the flanges of the side channel and is spaced from the top of the channel so that the lever can rock. The central portion of the top of the channel may be provided with an opening 13 that will allow the adjoining ends of the two levers to move up through the top of the channel in order to permit them to be tilted at a sharper angle than otherwise would be the case. It will be seen that when the rear end of tow lever 6 is pressed down, the rear end of the front lever will be swung upward. Preferably, the front end of the tow lever is in the form of a ball 14 that rocks and slides against the overlapping rear end of the front lever as the two levers rock.

Rigidly attached to the bottom of front lever 11 is a rigid plate 15 that extends forward from that lever. This plate supports a pair of forwardly diverging leaf springs 16, the rear end portions of which are secured to the plate. To make the connections between the springs and the plate adjustable, the springs overlap the plate and the rear end of each spring is connected to the plate by a hinge 17 extending across the spring. A few inches in front of the hinge there is an inverted stirrup 18 that straddles the spring and has threaded legs extending slidably down through the plate. Nuts 19 are screwed on the lower ends of these legs. The stirrups limit the distance that the springs can be swung upward on their hinges.

The front ends of the two leaf springs are fastened to the rear axle 21 of the automobile on opposite sides of the differential. This connection can be made by vertical clamps 22 secured to the axle by U-bolts 23 extending around the axle and through the clamps. Each clamp is provided below its U-bolt with a horizontal slot 24, through which the front end of one of the leaf springs extends. The normal vertical curvature of the leaf springs and the level of plate 15 relative to the axle clamps are such that in order to mount the front ends of the springs in the axle clamps it is necessary to stress the springs upwardly. The result is that the springs press downward continually on the axle clamps and simultaneously attempt to swing the front end of the front lever upwardly. The upward pressure of the springs on the lever can be controlled by adjusting stirrups 18 up or down in the plate. The closer the stirrups hold the springs to the plate, the greater the upward pressure of the springs on the plate and the greater the resistance of the springs to depression of the front end of the front lever.

The normal unstressed positions of the two levers are inclined, with the front end of tow lever 6 depressed and the front end of the other lever 11 raised. When a trailer is connected to ball 8 at the rear end of the tow lever, the weight on the ball will press it down and cause the front end of the lever to raise the rear end of the front lever 11 and thereby lower its front end against the resistance of springs 16. The stirrups 18 are adjusted so that the two levers will be substantially in line at this time and more or less parallel to the ground, as shown in FIG. 1. In towing a trailer over a road with this hitch, the pulling force is transmitted from the automobile down through supporting channel 1, the rear pivot pin 7 and the tow lever to the trailer tongue connected to ball 8. The front lever 11 and the lever springs are never under longitudinal tension; they do not take part in the pulling.

Whenever the trailer strikes a bump in the road that causes the front end of the trailer tongue to exert increased downward pressure on the tow lever ball 8, which with ordinary trailer hitches would depress the rear end of the automobile body, the tow lever is tilted so that its front end swings the rear end of the front lever upwardly in the supporting channel. The simultaneous swinging down of the front end of the front lever is resisted by the leaf springs, which are already under stress. The result is that any appreciable downward movement of pivot pin 12, due to the load on ball 8, is prevented by the springs, so that channel 1 remains at substantially the same height as before in spite of the downward pressure exerted on it by the tow lever through pivot pin 7. Consequently, the automobile body, instead of being pushed down by the sudden increased pressure on the tow lever ball, continues at substantially the same level. By eliminating or greatly reducing bouncing of the automobile body caused by the trailer, the ride becomes much more comfortable and the car easier and safer to handle.

In the modification shown in FIGS. 3 and 4, the principal difference from the first embodiment of the invention is that instead of hinging the rear ends of the leaf springs 30 to their supporting plate 31, they are rigidly attached to it and it is connected through a hinge 32 to the front lever 33 of the hitch as will be described presently. Another difference is that the supporting channel member 34 can be adjusted vertically relative to the automobile body in order to provide the best level for the hitch. For this purpose parallel vertical side bars 35 engage the opposite sides of the channel and have their upper ends welded to a cross member 36 that can be bolted to the bottom of the car body. The bars are provided with vertical slots 37, through which extend the threaded ends of a bolt 38 that is welded to the top of the channel. Nuts 39 on the bolt clamp the channel to the bars at any desired height. Vertical ribs 40 may be welded to the sides of the channel at opposite sides of the slotted bars to help prevent tilting of the channel.

A tow lever 42 is pivotally mounted in the rear end of channel 34 on a cross pin 43 and projects rearwardly from the channel. The projecting end of the lever supports a tow ball 44 for connection to a trailer. The front end of the lever in the channel is overlapped by the rear end of front lever 33, which likewise is pivoted in the channel on a cross pin 45. To reduce friction between the two levers, the front end of the tow lever may be provided with a roller 46 that engages the adjoining overlying surface of the front lever.

The plate 31 is mounted on the front end of a bar 48, the rear end of which is connected by hinge 32 to the bottom of the front lever. The rear end portions of the two leaf springs are laid on the plate at opposite sides of the bar and are clamped tightly in place by an overlying clamping plate 49 and a number of bolts 50 extending through both plates. The vertical angle that the plate makes with the front lever can be adjusted by a screw 51 threaded through the rear portion of the bar and bearing against the bottom of the overlying lever. The front ends of the two springs extend through slots 52 in the lower portions of clamps 53 connected to the rear axle 54 of the automobile by U-bolts 55.

The action of this hitch in compensating for the vertical movements of the trailer and preventing them from being transmitted to the automobile is the same as the hitch first described. However, instead of the stirrups 18 that adjust the tension on the leaf springs, adjusting screw 51 is used for the same purpose.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An automobile trailer hitch, comprising a rigid lever-supporting member, means for fastening said member rigidly to the bottom of the rear end of an automobile body, a tow lever pivotally connected to said member on a horizontal axis and projecting rearwardly therefrom, means on the rear end of the lever for supporting a trailer connection, a lever pivotally connected to said supporting member in front of the tow lever on an axis parallel to said horizontal axis, the rear end of the front lever overlapping and engaging the front end of the tow lever, a plate attached to the front lever and projecting forward therefrom, a pair of forwardly diverging leaf springs having rear end portions secured to said plate, and means for fastening the front ends of said springs to the rear axle of an automobile in a position requiring the springs to be stressed upwardly, whereby when downward pressure on the rear end of the tow lever causes that lever to swing the rear end of the front lever upwardly the leaf springs will resist depression by the tilting front lever so the latter will keep said supporting member from being moved downwardly appreciably by the tow lever.

2. An automobile trailer hitch according to claim 1, including means associated with said plate for adjusting the vertical angle of said rear end portions of the springs to the front lever.

3. An automobile trailer hitch according to claim 1, in which said plate is rigidly attached to the front lever and including means hinging the rear ends of the springs to the top of the plate, and an inverted stirrup straddling each spring in front of its hinge and connected to the underlying plate to limit the distance the spring can be swung upward on its hinge.

4. An automobile trailer hitch according to claim 1, in which said rear end portions of the springs are rigidly secured to said plate and including a hinge attaching the plate to the bottom of the front lever transversely thereof.

5. An automobile trailer hitch according to claim 1, in which said rear end portions of the springs are rigidly secured to said plate and including a hinge attaching the plate to the bottom of the front lever transversely thereof, and an adjusting screw extending up through the plate in front of the hinge and bearing against the bottom of the front lever.

References Cited by the Examiner

UNITED STATES PATENTS

| | | | |
|---|---|---|---|
| 2,772,098 | 11/1956 | Seeley | 280—406 |
| 2,852,274 | 9/1958 | Seiley | 280—489 |
| 2,966,369 | 12/1960 | Paul | 280—489 |
| 3,180,657 | 5/1965 | Molter | 280—406 |

LEO FRIAGLIA, *Primary Examiner.*